June 16, 1936.   T. BARTHOLOMEW   2,044,198
MANUFACTURE OF CAST SLAG ARTICLES
Filed Sept. 9, 1932   5 Sheets-Sheet 1

INVENTOR
Tracy Bartholomew

June 16, 1936. T. BARTHOLOMEW 2,044,198
MANUFACTURE OF CAST SLAG ARTICLES
Filed Sept. 9, 1932 5 Sheets-Sheet 2
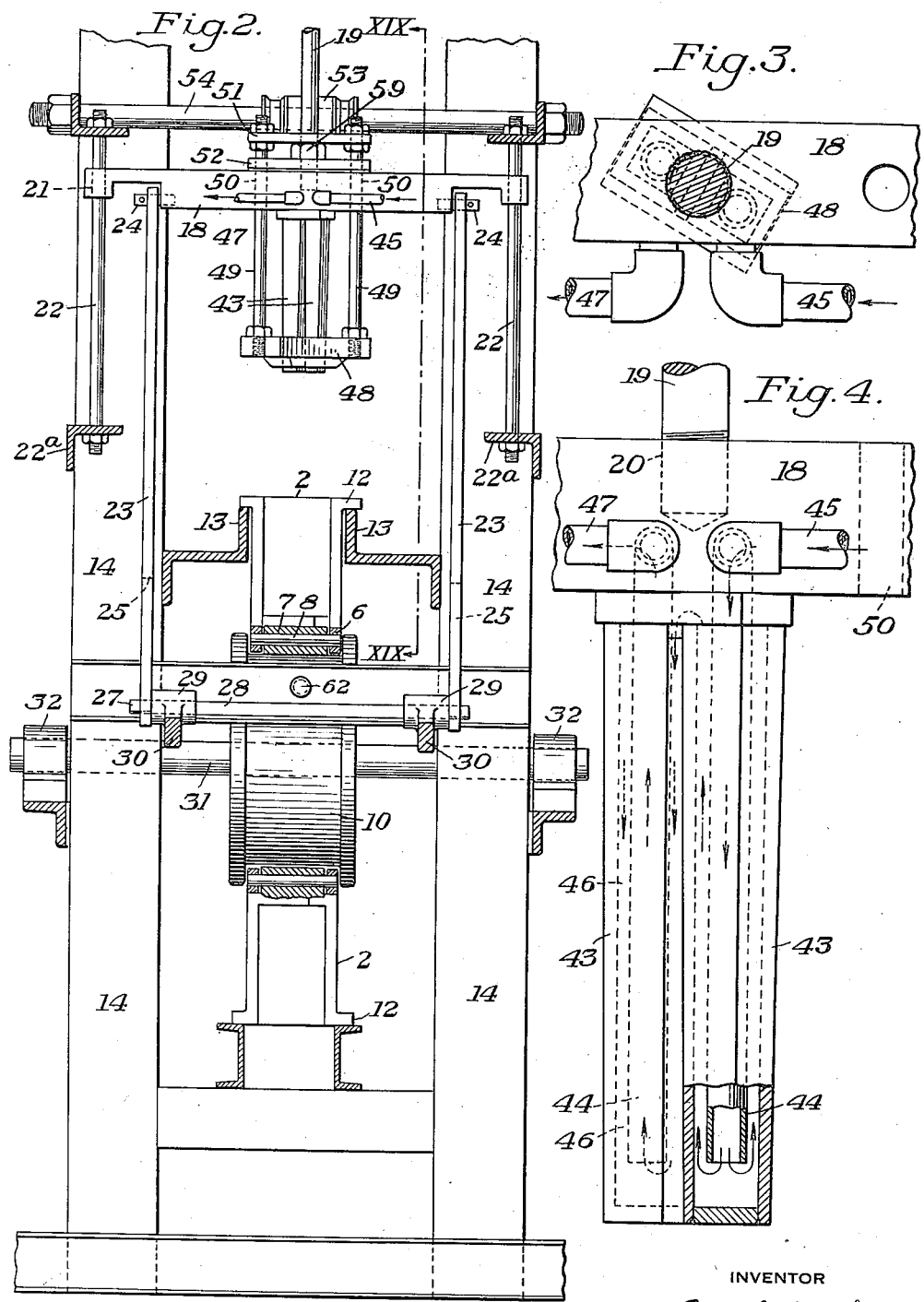
INVENTOR June 16, 1936. T. BARTHOLOMEW 2,044,198
MANUFACTURE OF CAST SLAG ARTICLES
Filed Sept. 9, 1932 5 Sheets-Sheet 3
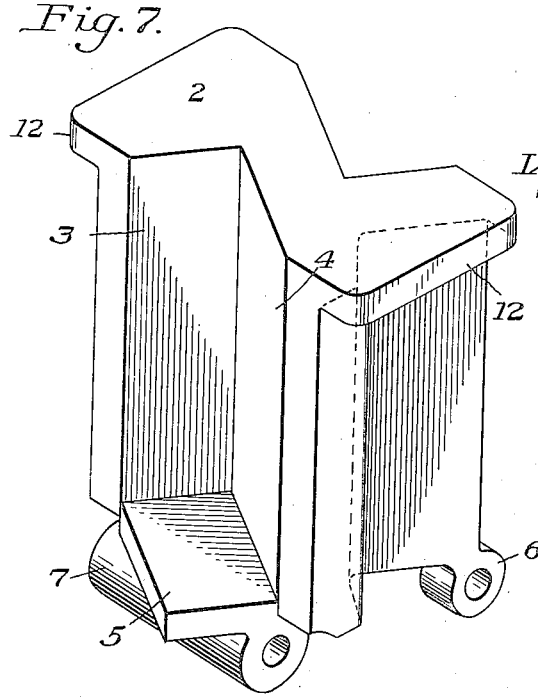
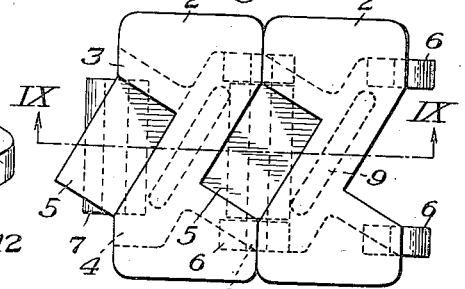
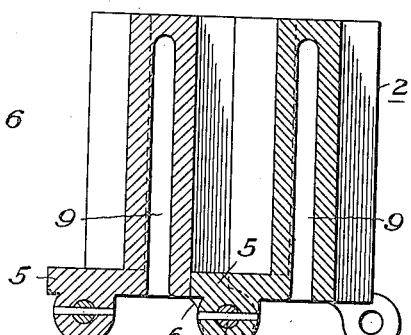
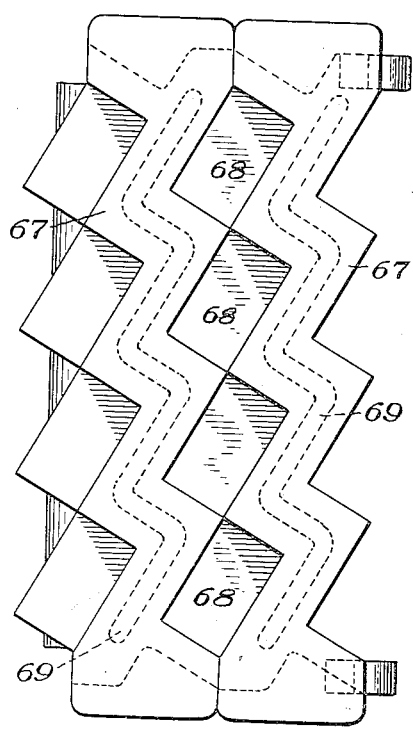
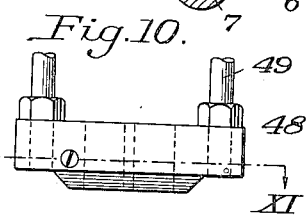
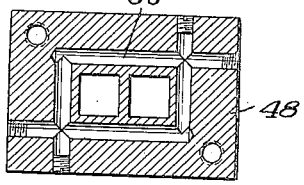
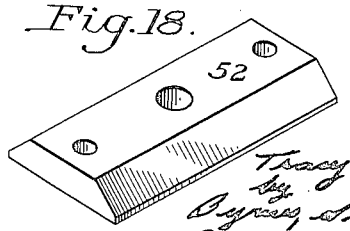
INVENTOR

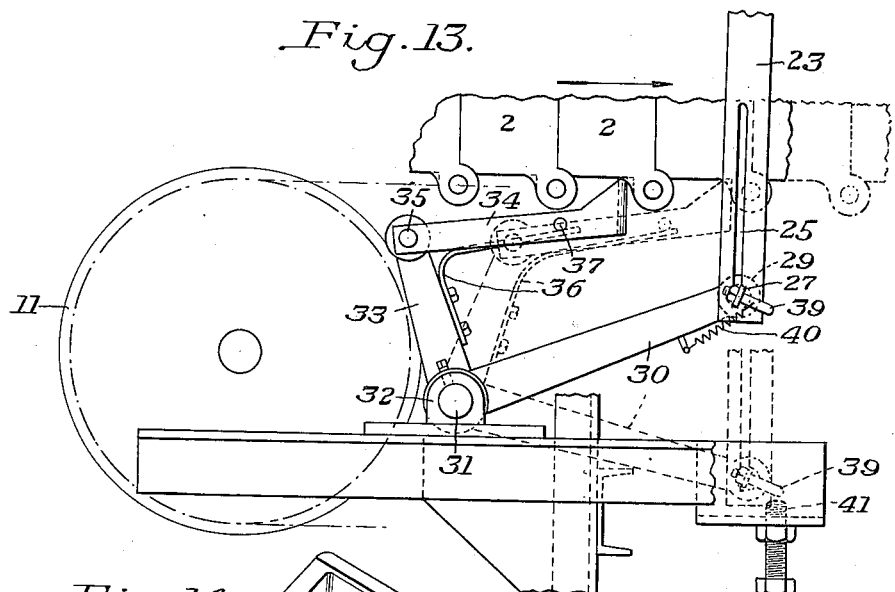
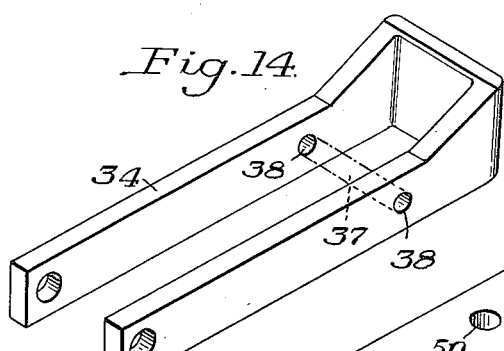
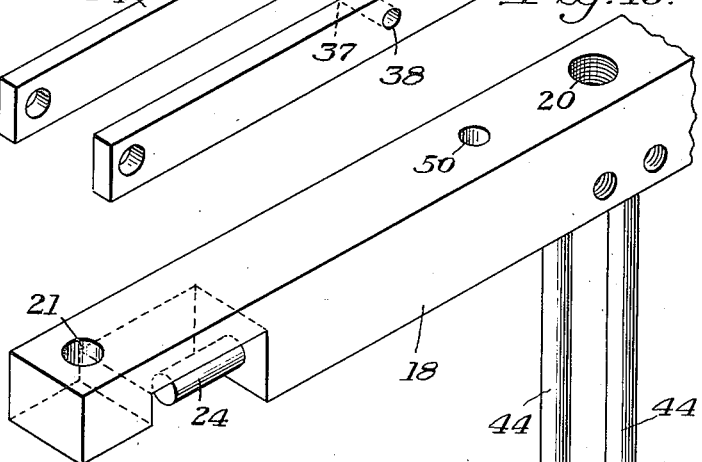
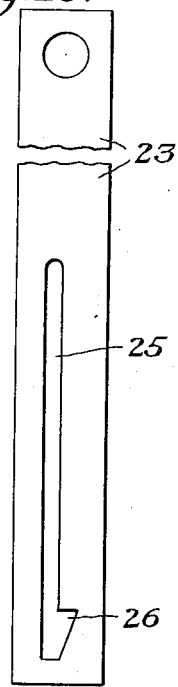
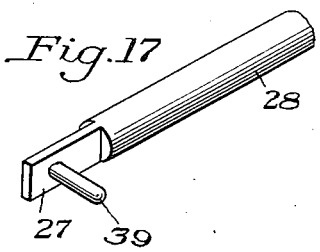

June 16, 1936.　　T. BARTHOLOMEW　　2,044,198
MANUFACTURE OF CAST SLAG ARTICLES
Filed Sept. 9, 1932　　5 Sheets-Sheet 5
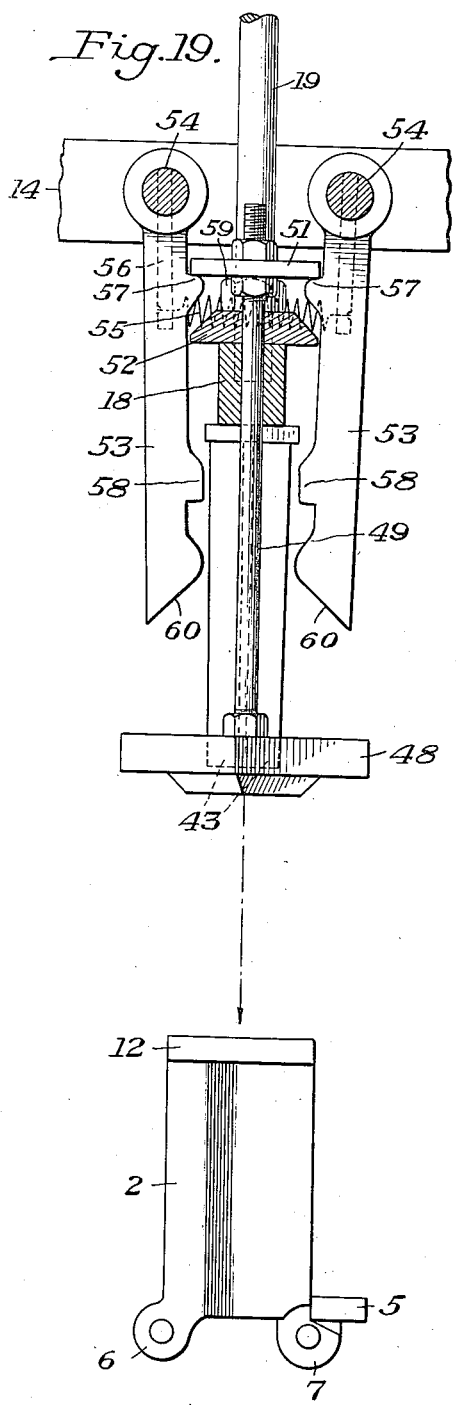
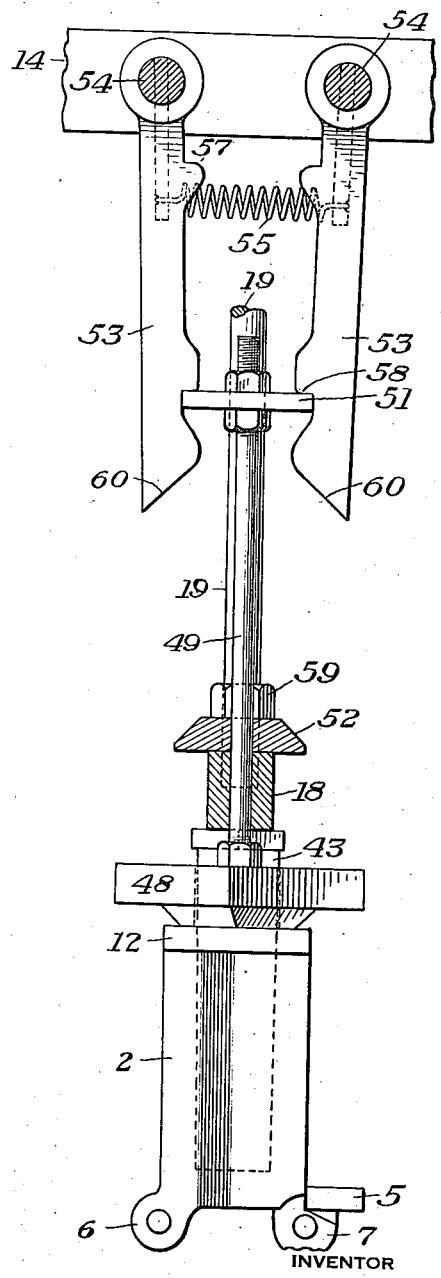
INVENTOR Patented June 16, 1936

2,044,198

UNITED STATES PATENT OFFICE 2,044,198

MANUFACTURE OF CAST SLAG ARTICLES

Tracy Bartholomew, Pittsburgh, Pa.

Application September 9, 1932, Serial No. 632,377

7 Claims. (Cl. 49—39)

This invention relates generally to the manufacture of cast slag articles, and more particularly to construction material such as building blocks or bricks having accurately defined external surfaces, lines and edges free from swelling, deformation or rupture.

In the accompanying drawings, which illustrate one form of apparatus which may be used in carrying out the method, Figure 1 is a side elevation of the whole apparatus;

Figure 2 is a vertical section on the line II—II of Figure 1, parts being shown in elevation;

Figure 3 is a partial detail plan view of a portion of the cross head, and fingers which form the internal cavities in the article;

Figure 4 is a vertical elevation of the parts shown in Figure 3;

Figure 7 is a perspective view of one of the mold sections, two of such mold sections being used to form the molding cavity;

Figure 8 is a plan view of two mold sections forming the molding cavity for the brick shown in Figure 5;

Figure 9 is a section on the line IX—IX of Figure 8;

Figure 10 is an elevation of the top die used in forming the top surface of the brick;

Figure 11 is a section on the line XI—XI of Figure 10;

Figure 12 is a plan view of a modified type of mold in which two mold sections form a plurality of molding cavities;

Figure 13 is an enlarged detail view illustrating the mechanism for moving the molds;

Figure 14 is a perspective view of the pawl shown in Figure 13;

Figure 15 is a perspective view of a portion of the cross head and tubes used to cool the fingers which form the cavities in the article;

Figures 16 and 17 are detail views of parts shown in Figure 13;

Figure 18 is a perspective view of a cam plate used in actuating the latches which control the movement of the plunger; and Figures 19 and 20 are vertical sections on the line XIX—XIX of Figure 2, and showing the plungers in raised and lowered positions, respectively.

Figure 1:
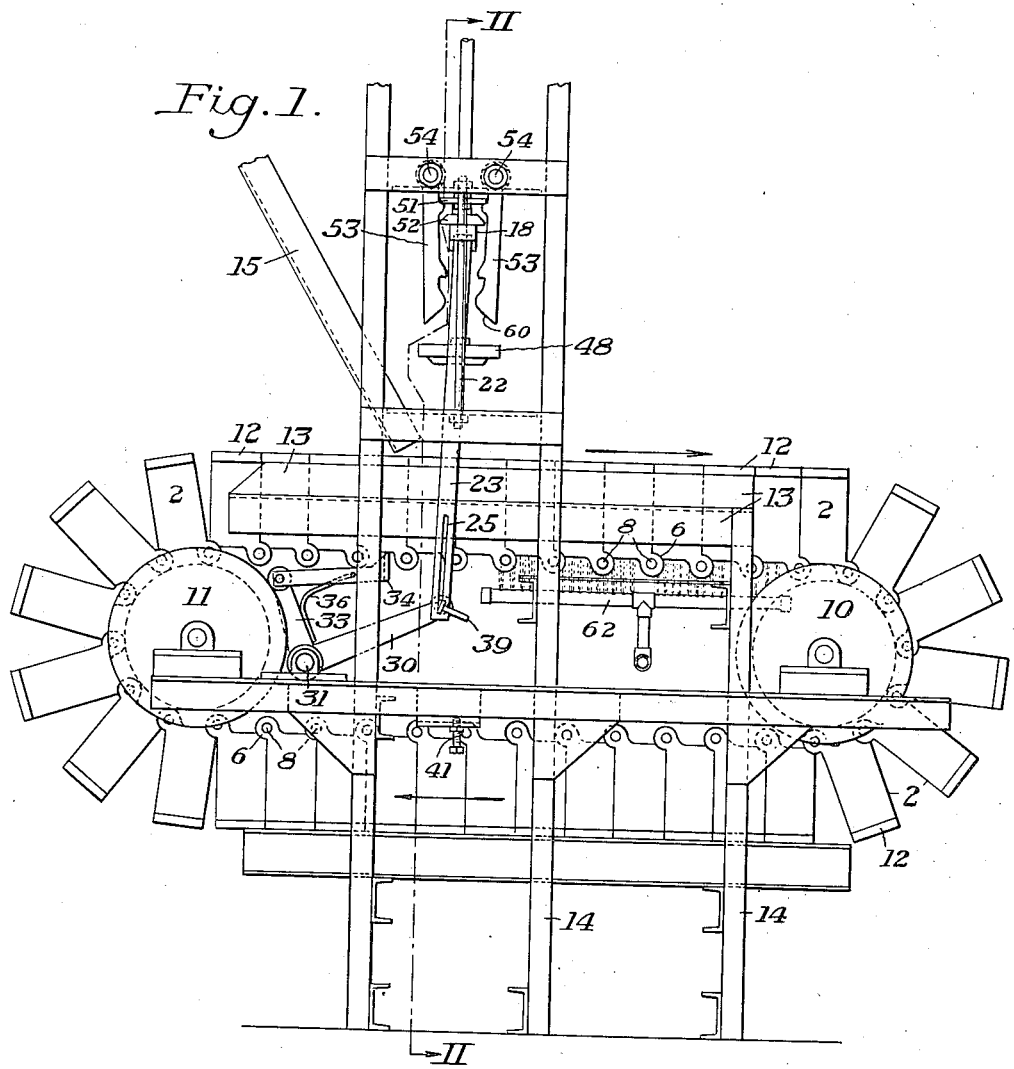
Figure 5:
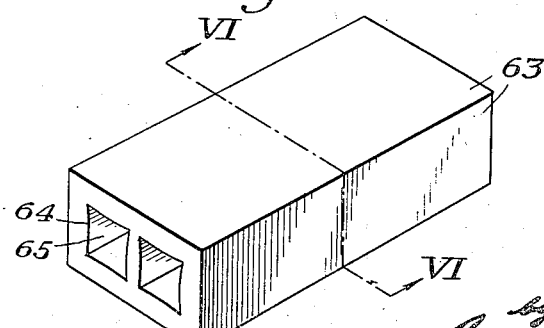
Figure 5 is a perspective view of a cast slag brick made according to the present invention.

Slag has ben cast into commercial articles by two processes. In the first, the molten slag is flowed into heavily insulated thin metal molds, covered with additional molten slag to insure slow cooling, and permitted to solidify and cool in situ for several days after which it is dug up, stripped from the forms, and sorted out for shipment. This process does not give well-shaped products nor uniformly high quality and is suitable only for making crude, heavy, dense articles in which accurate dimensions are not necessary, as for pavers and revetment blocks. The process is very slow, involves high costs for molds and for labor, an excessive working area, and great waste of materials.

The second process comprises flowing the molten slag into heavier uninsulated metal molds where it is cooled until a crust sufficiently strong is formed, after which the article is removed, reheated if necessary, annealed and cooled in separate apparatus. This process gives rapid operation, higher quality, larger output, better utilization of material and involves less cost for molds, working space and labor. Unfortunately, however, this process has not been successful with slags of the type now being produced in modern American iron blast furnaces.

When these slags are treated by this method, they usually rupture at the unmolded surface soon after being cast, so that the resulting product is commercially valueless. This phenomenon may occur either while the article is still in the mold or soon after it has been removed. It is believed to be due to the release and squeezing out from solution of part of the dissolved gases which are always present in these slags, internal stresses being thereby set up which tend to increase the volume of the article and produce strains resulting in the rupture of its more or less rigid cooler surfaces.

I have discovered how to prevent all rupture and how to control the location of any deformation. By exercising such control I am able to prevent deformation on those surfaces of the article which need be accurate and to localize any deformation to a part of the article where accuracy of shape is unobjectionable. I obtain these results by cooling the surfaces of the article differently.

I have found that rupture of a surface occurs only when none of the surfaces is sufficiently flexible and free to deform at the time when the internal stresses are relieved. I completely eliminate rupture by maintaining at least one surface of the article sufficiently flexible and free to deform during the solidification of the interior of the article and thereby relieve the internal stresses without rupture.

I have found that deformation occurs only in unsupported surfaces which are most flexible or least rigid when deformation relieves the internal stresses. I successfully localize such deformation by cooling the surfaces of the article in such a manner that those which are desired to be accurate shall always be less readily deformable by internal stresses than are the surfaces which are not required to be accurate and where I, therefore, cause any deformation to take place. I cause the surfaces of the article to be more or less readily deformable, as desired, by cooling them differently so that more or less rigid or more or less flexible skins or crusts are produced on the surfaces while the interior of the article is still molten or viscous in nature. I prefer to start this differential cooling as soon as the molten slag is charged into the mold and to continue it after the article is removed from the mold and until the interior is completely solidified or as long as may be necessary.

Although the same results might be obtained by making the mold of materials which will conduct heat away from the freshly cast article at different rates, I prefer to obtain the differential cooling while the article is still in the mold by holding the surfaces of the mold in contact with the freshly cast article for different lengths of time.

Ordinarily I may retain the mold for 5 to 30 seconds in contact with the surfaces which are desired to be accurate, depending upon the amount of sensible heat desired to be retained for annealing, whereas I may remove part of the mold from contact with the surfaces where any deformation is to be localized after only 1 or 2 seconds, depending upon the temperature of the slag as charged and the time necessary for it to form a self-supporting crust.

I have found it advantageous to make my molds of metal of good heat conductivity and to cool them strongly either by circulating cold water through channels therein or by spraying with water, depending upon the article being made and the type of casting machine being used. Such molds are preferred not only because they accelerate operations, increase production and decrease costs, but also because by their use I can obtain the steepest temperature gradient in the surfaces of the freshly cast article and, therefore, the thinnest, most flexible, and most readily deformable surface crust or shell that will have enough strength to retain its shape upon removal from the mold. Such molds give the necessary strength of surface crust with the minimum loss of sensible heat and, therefore, conserve the maximum amount of sensible heat for use in annealing the articles after casting. Consequently, I ordinarily find it unnecessary to supply any additional heat to obtain first class annealing.

While it is not an essential of my invention, I find it most convenient to produce the deformation in parts of the article which, because of their shape, naturally lose their sensible heat more slowly than do the surfaces which are desired to accurately retain their original shape. Cavities, which term is herein used to include re-entrant surfaces and depressions open to the surface, are particularly preferred for the localization of any deformation because surfaces of such form radiate heat more slowly, automatically remain hotter, solidify and develop a rigid crust more slowly and consequently remain flexible and deformable longer than do other surfaces. By using such cavities, it is not necessary to give any further attention to the maintenance of a more flexible condition in such surfaces after casting as this is automatically taken care of by their shape.

By initially cooling to a greater extent the surfaces which are desired to be accurate than surfaces where deformation is to be localized, and by insuring, as by the use of cavities or depressions, that the relative deformabilities shall be maintained, I find that rupture is entirely prevented and deformation satisfactorily localized. The hotter, more deformable surfaces of the cavity act as safety devices to protect the surfaces where accuracy is desired.

When slag articles are properly annealed and cooled, the use of such cavities does not disadvantageously affect their strengths. Slags so treated have compressive strengths of the order of 30,000 lbs. per sq. in., which is appreciably higher than that of most competitive products including natural stone. Consequently, such cavities in cast slag articles may often be of liberal size and in considerable number and the article still have more strength than is ordinarily required for its intended use. Furthermore, the use of cavities affects an appreciable and generally most desirable reduction in weight. A cast slag article may be designed to give the strength required, yet have a minimum of weight. This is highly advantageous, as it results in reduced costs for trucking, shipping and handling, as well as in reduced dead loads in the completed structure.

In casting slag into very light weight articles, it is often convenient and advantageous first to puff up or foam the molten slag, as disclosed in Sem Patent No. 1,471,421, granted October 23, 1923, and my Patent No. 1,901,891, granted March 21, 1933, so that it contains a considerable proportion of gas bubbles. When such foamed slag is cast, the deformation does not always take the form of swelling. Rarely, the gas bubbles may break, the gas escapes, and a surface partially collapse and become concave. While my invention as herein described is primarily designed to protect against deformation of surfaces by swelling, it is also designed to, and does, protect against any other kind of deformation which may occur during the change from the molten to the solid state.

Referring more particularly to the accompanying drawings, the articles are cast in a series of molds forming an endless chain. The mold cavity for each article is formed by two adjacent mold sections 2, one of these mold sections being illustrated in detail in Figure 7. The mold section shown in this figure has side walls 3 and 4 and a bottom plate 5. At one end of the mold section adjacent the bottom thereof are spaced lugs 6 and at the other end is another lug 7 which fits between the lugs 6 of an adjacent mold section and is secured thereto by pin 8, the two mold sections forming a molding cavity which is closed at its sides and bottom, but open at the top. Each of the mold sections is provided with a cooling cavity 9 which is open at the bottom and into which a cooling medium is directed upwardly in order to cool the mold sections and the surfaces of the articles in contact with the mold. The hinged mold sections pass around drums 10 and 11 in the direction indicated by the arrow in Figure 1. The molds are provided at their tops with flanges 12 which slide on Z-bars 13 secured to the framework 14. The molds are moved intermittently by mechanism about to be described and are fed with molten slag flowing from a feed trough 15. After the molds have been supplied with the required amount of slag, a cavity is formed in the article by a plunger, the plunger is then removed and water or other cooling medium is directed into the cooling cavities 9, and as the mold sections pass around the drum 10, they spread apart and the articles fall from the molds. The articles are then transferred to an annealing chamber and after they cool, are ready for shipment.

The mechanism for intermittently moving the molds past the feed trough is shown in Figures 1, 2 and 13 through 17. A cross head 18 is connected to the lower end of a piston rod 19 which may be reciprocated by any desired means (not shown). A portion of the cross head is shown in detail in Figure 15 and is provided near its center with a threaded opening 20 for receiving the piston rod and with an opening 21 adjacent each end for receiving a guide rod 22 which is supported by angles 22a secured to the framework. The upper ends of connecting rods 23 are pivotally mounted on pins 24 secured to each side of the cross head. The lower end of each of the connecting rods is provided with a slot 25 which is shaped at its lower end to form a notch 26. Extending through each of the notches 26 is a flattened end 27 of a cross rod 28 which is rotatably mounted adjacent each end in bearings 29 formed on the ends of each of two arms 30, which arms are secured at their other ends to a shaft 31 mounted in bearings 32 secured to the framework. An arm 33 is also rigidly connected to the shaft 31 at its lower end and to its upper end a pawl 34 is pivoted, as indicated by the reference numeral 35. The pawl is held normally in its upper position, as indicated by the full lines in Figure 13, by a spring 36 which presses against a pin 37 mounted in holes 38 in the pawl. As the connecting rods 23 move down, they rotate the arms 30 and 33 clockwise, and by means of the pawl 34 contacting with the lugs 7 on the molds, move the molds to the right as indicated by the arrow. As the connecting rods move up, the pawl is moved to the left and is depressed against the action of the spring until it is in position to move the molds another step forward when the connecting rods are again lowered.

The cross head 18, to which the connecting rods 23 are connected, is primarily used to impart up and down movement to the plungers 43 which are used to form the depressions or cavities in the article, as will be described. In the travel of the molds, they are first moved to a position underneath the slag chute and remain stationary at this point for a short interval while the plunger is being lowered into and lifted from the previous mold. As the plunger then starts downward, the freshly filled mold is moved forward by the mechanism above described. Figure 13 shows the position of the parts which move the molds as they appear at the time the piston rod is about to start down and the flattened ends 27 of the rod 28 are held in the notches 26 by a spring 40 connected to the pin 39. When the flattened end 27 is in the notch 26, downward movement of the connecting rods 23 rotates the arms 30 without any lost motion, thereby moving the pawl 34 from the full line to the dotted line position indicated in Figure 13, the arms 30 also moving to their dotted line positions. When the arms 30 have reached their lower position, the pin 39 strikes against a stop 41 and the rod 28 is rotated in its bearings so that the flattened ends 27 slide in the slots 25 of the connecting rods during the lower part of the movement of the connecting rods. It will be seen, therefore, that during the lower part of the movement of the plungers, the molds remain stationary due to the lost motion connection between the connecting rods and arms 30.

Water cooled plungers or fingers 43 are secured at their upper ends to the cross head 18, as shown in Figures 3 and 4. A tube 44 which is connected to and in communication with the cross head 18 at its upper end extends into each of the plungers 43. Cooling water is supplied to the plungers through an inlet pipe 45, the water flowing downwardly inside of one of the tubes, then upwardly between the tubes and the plunger, then into the space 46 between the other plunger and its tube, and then upwardly through the other tube and out through the outlet pipe 47. A top die 48, which forms the top surface of the article in the mold, is secured to the lower ends of rods 49 which pass through openings 50 in the cross head 18 and are secured to and spaced by a plate 51 adjacent their upper ends. The top die 48 is provided with passages 66 through which water may be circulated to cool the die and form a solidified crust on the upper end of the cast slag article. Secured to the top of the cross head 18 is a cam plate 52 used to operate latches 53 which hold the top die in both its upper and its lower positions. The plungers 43 and top die 48 are shown in their upper positions in Figure 19 and in their lower positions in Figure 20. The latches are pivoted at their upper ends to rods 54, the latches being biased toward each other by a spring 55 connected to pins 56 secured to the rods 54. In the position shown in Figure 19, the top die 48 is held in raised position by the plate 51 resting on projections 57 formed on the latches. As the piston rod 19 is lowered, it lowers the cross head 18, the cam plate 52 and the plungers 43, the cross head sliding on rods 49 and the top die 48 remaining in its raised position. When the cam plate 52 has been lowered to a position opposite projections 58 on the latches, it contacts with the projections, spreading the latches apart and unseating the plate 51 from the projections 57. Further downward movement of the piston rod also lowers the top die 48, the rods 49 and the plate 51 until the top die seats on the mold, as shown in Figure 20. As the piston rod is raised, it first removes the plungers 43 from the mold, the cross head 18 sliding on the rods 49 during this part of the movement and the top die 48 being held tightly on the mold by the projection 58 on the latches pressing down on plate 51. But when the cam plate 52 has been raised until it spreads the latches by contacting at point 60, the plate 51 is released from the projections 58 so that the nut 59 above the cam plate 52 contacts with plate 51 and further upward movement of the piston rod raises the top die from the mold until the plate 51 again rests on projection 57 of the latches, as shown in Figure 19. It will be seen that in this movement, the plungers 43 are first lowered into the mold, the top die 48 is then lowered onto the mold, the plungers are then removed while the top die remains on the mold, and then the top die is removed from the mold.

After the molds have moved beyond the plungers 43, they pass over sprays of water issuing from a pipe 62. The water is directed upwardly into the cooling cavities 9 formed in the molds and the excess water running out of the cooling cavities of the molds in the upper flight falls down upon the lower flight of molds and collects in the cooling cavities of the lower flight molds. The molds then pass around drum 10 which spreads them apart and allows the article to drop out from the mold sections. The articles are then placed in a cooling chamber to anneal and toughen them.

Figure 6:
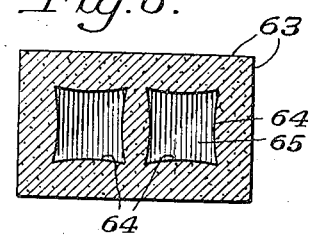
Figure 6 is a section on the line VI—VI of Figure 5.

The operations are so timed that the water cooled plungers 43 remain in the mold only a relatively short time, as compared with the time that the articles remain in the molds. For example, the plungers may remain in the molds for only one or two seconds, whereas the articles may remain in the molds for a period of from five to thirty seconds. The relatively short period during which the plungers remain in the molds causes the formation of a relatively thin crust on the walls of the cavities, as compared with the relatively thick crust on the external surfaces of the articles which are formed in contact with the water cooled surfaces of the mold. As shown in Figure 6, the external surfaces 63 of the article are not deformed, but conform substantially to the mold in which they were formed. However, the walls 64 of the mold cavities 65 are deformed by the internal stresses released during solidification of the slag. The solidified crust forming the walls 64 of the cavities is relatively thin and flexible, as compared with the crust formed on the external surfaces of the article, the thin flexible crust on the wall 64 taking care of the internal stresses set up during solidification without, however, causing deformation of the external surfaces of the article.

If desired, a plurality of articles may be cast between each of the mold sections. Such an arrangement is shown in Figure 12, in which adjacent mold sections 67 form a plurality of molding cavities 68. Each of the mold sections is provided with cooling cavities 69 similar to the cavities 9 already described.

Articles made by the described process are characterized by freedom from rupture, by absence of deformation in at least one of the exterior surfaces, and by a variable amount of deformation in at least one surface. Lack of deformation can be readily recognized by regularity of surface. Deformation can be readily recognized by warpage of a surface. When a plurality of nominally like articles are available for comparison, the presence of typical deformation or warpage is clearly recognizable by the dissimilarity of the warping in the deformed surfaces of the otherwise like articles.

The term "slag" as used herein is intended to include not only iron blast furnace slag, but slag from other furnaces and also synthetic slags made by melting slag producing materials.

I have illustrated and described one embodiment of an apparatus which may be used in practicing the process. It is to be understood, however, that the invention may be otherwise embodied or practiced within the scope of the following claims.

I claim:

1. A cast slag article having external surfaces conforming substantially to the shape of the mold used in casting it, the article having a cavity, the walls of the cavity being deformed by internal stresses during solidification.

2. The method of relieving internal stresses in a cast slag article during solidification, which comprises casting slag in contact with a forming means, and maintaining at least one of the surfaces which contacted with the forming means in a more readily deformable condition during solidification of the interior of the article than another surface which contacted with the forming means.

3. The method of preventing deformation of an external surface of a cast slag article, which comprises forming a cavity in the article, and maintaining at least one of the walls of the cavity in a more readily deformable condition during solidification of the interior than the external surface.

4. The method of making a slag article which comprises casting molten slag in a forming means to form the article, removing at least a part of the forming means from the article before the interior of the article solidifies, and maintaining a part of a surface of the article in a more readily deformable condition than the other parts of the surface during the solidification of the interior of the article.

5. In the manufacture of cast slag articles, the method of localizing deformation during solidification of the interior which comprises bringing a portion of the surface of the article to a temperature sufficient to permit said portion to deform by internal pressure but not sufficient to fuse it.

6. In the method of making a cast slag article, the step which comprises solidifying the interior of the article while maintaining at least one part of the surface sufficiently non-rigid to deform without rupture.

7. A cast slag article having all of its external surfaces shaped by solid mold surfaces and free from rupture, at least one surface of the article being deformed by warpage.

TRACY BARTHOLOMEW.